E. REDMOND.
Decoy for Wild Fowls.
No. 217,483.   Patented July 15, 1879.
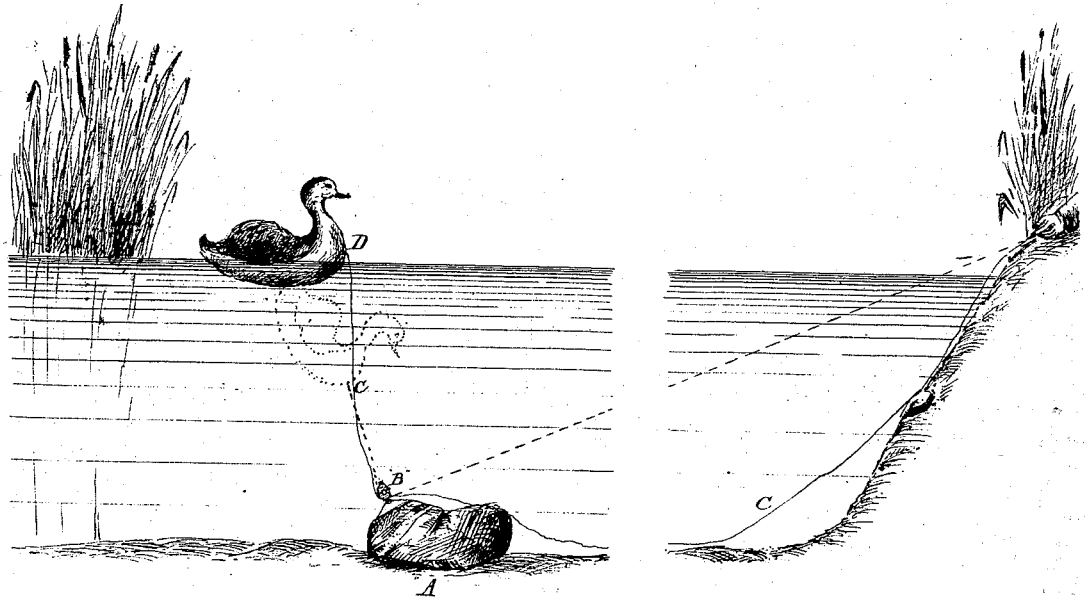
Witnesses.
Inventor.

UNITED STATES PATENT OFFICE

EDMOND REDMOND, OF ROCHESTER, NEW YORK.

IMPROVEMENT IN DECOYS FOR WILD FOWL.

Specification forming part of Letters Patent No. 217,483, dated July 15, 1879; application filed April 7, 1879.

*To all whom it may concern:*

Be it known that I, EDMOND REDMOND, of Rochester, in the county of Monroe and State of New York, have invented a new and useful Improvement in Decoys for Wild Fowl, which is fully set forth in the following specification, reference being had to the accompanying drawing.

The object of my invention is to make common decoys for wild fowl move and dive in water like living birds.

My invention consists of a combination including the bag A, pulley-block B, or a ring, its equivalent, cord C, and decoy D.

The bag A is made of canvas or other suitable material, and should be large enough to hold ten or twelve pounds of sand or stones.

A pulley-block, B, is attached to the bag by a running cord in eyelet-holes at the mouth of the bag, by which the latter can be closed.

A cord, C, is put through the pulley-block, and attached under the breast of the decoy D by a screw-eye.

The bag, having been weighted with sand or other suitable material, is dropped in the water wherever the sportsman desires to shoot. The loose end of the cord connecting the decoy and bag through the sheave-block is then taken to the shooter's place of concealment, and when he wants to make the decoy dive he pulls the cord, and the decoy dives directly over the submerged bag.

In running water, or when wind prevails, the decoy can be let go with the current or drawn back by letting out or drawing in the cord.

Any suitable weight will answer as well as a weighted bag; but that is most convenient, as it may be emptied when one is through shooting.

I claim—

The combination of the decoy D, the cord C, and the bag A, as described.

EDMOND REDMOND.

Witnesses:
 OWEN REDMOND,
 EDWARD M. REDMOND.